United States Patent
Dehghan et al.

(10) Patent No.: US 8,902,769 B1
(45) Date of Patent: Dec. 2, 2014

(54) METHOD AND APPARATUS FOR OVERSUBSCRIPTION CONTROL IN A WI-FI HOME NETWORK

(75) Inventors: Hossein Dehghan, Danville, CA (US); Safiali Rouhi, Oakland, CA (US); Sam Heidari, Los Altos Hills, CA (US)

(73) Assignee: Quantenna Communications, Inc., Fremont, CA (US)

( * ) Notice: Subject to any disclaimer, the term of this patent is extended or adjusted under 35 U.S.C. 154(b) by 235 days.

(21) Appl. No.: 13/200,639

(22) Filed: Sep. 26, 2011

Related U.S. Application Data

(60) Provisional application No. 61/386,456, filed on Sep. 24, 2010.

(51) Int. Cl.
| | |
|---|---|
| *H04W 4/00* | (2009.01) |
| *H04L 12/413* | (2006.01) |
| *G06F 15/173* | (2006.01) |
| *H04B 17/00* | (2006.01) |
| *H04W 72/00* | (2009.01) |
| *H04B 7/00* | (2006.01) |
| *H04L 12/26* | (2006.01) |
| *H04W 24/00* | (2009.01) |

(52) U.S. Cl.
CPC ............... *H04L 12/26* (2013.01); *H04W 24/00* (2013.01)
USPC ........... 370/252; 370/329; 370/338; 370/447; 709/224; 455/67.11; 455/452.1; 455/509

(58) Field of Classification Search
CPC ............ H04L 12/2671; H04L 12/2639; H04L 12/2642; H04L 12/2602; H04L 12/2634; H04L 12/2676; H04L 12/2692; H04L 1/0026; H04L 5/0007; H04L 29/06; H04L 29/08072; H04L 41/22; H04L 43/00; H04L 43/50; H04L 47/10; H04L 12/403; H04L 12/413; H04L 12/2697; H04L 12/40143; H04L 43/0852; H04W 24/00; H04W 92/18; H04W 76/00; H04W 88/08; H04W 8/26; H04W 16/10; H04W 24/08; H04W 28/04; H04W 74/02; H04W 74/0816; H04W 80/04; H04W 84/08; H04W 84/12; H04W 84/18; H04W 88/06; G08C 17/00; H04B 7/15; H04B 17/0042; H04B 17/0057
USPC .......... 370/252, 329, 412, 338, 447; 709/224; 455/67.11, 452.1, 509
See application file for complete search history.

(56) References Cited

U.S. PATENT DOCUMENTS

| | | | |
|---|---|---|---|
| 2002/0110083 A1* | 8/2002 | Stanwood et al. | 370/229 |
| 2003/0007456 A1* | 1/2003 | Gupta et al. | 370/232 |
| 2003/0100308 A1* | 5/2003 | Rusch | 455/445 |
| 2007/0258419 A1* | 11/2007 | Zhao et al. | 370/338 |

* cited by examiner

*Primary Examiner* — Alpus H Hsu
*Assistant Examiner* — Dharmesh Patel
(74) *Attorney, Agent, or Firm* — IP Creators; Charles C. Cary

(57) ABSTRACT

A wireless access point configured to support a wireless home network among multiple wireless devices contending with one another for access to a shared wireless communication medium. The wireless access point comprises a link monitor and a link manager. The link monitor monitors communication links with each of the wireless devices and for detects oversubscription of the wireless communication medium by the communication links. The link manager couples to the link monitor and is responsive to an oversubscription indication therefrom to arbitrate access to the shared wireless communication medium among the contending wireless devices.

4 Claims, 5 Drawing Sheets

Wi-Fi CSMA\CA with Oversubscription Management

Wi-Fi Oversubscription Management

METHOD AND APPARATUS FOR OVERSUBSCRIPTION CONTROL IN A WI-FI HOME NETWORK

CROSS REFERENCE TO RELATED APPLICATION

This application claims the benefit of prior filed Provisional Application No. 61/386,456 filed on Sep. 24, 2010 entitled "Bandwidth Allocation and Resource Management in Multiple Access Wireless Network" which is incorporated herein by reference in its entirety as if fully set forth herein.

BACKGROUND OF THE INVENTION

1. Field of Invention

The field of the present invention relates in general to Wi-Fi wireless access points (WAP) for home networks.

2. Description of the Related Art

Home networks are increasingly set up and serviced using a device called a Wireless Access Point (WAP). The WAP may include a router. The WAP couples all the devices of the home network, e.g. computers, printers, televisions to one another and to the Cable or Subscriber Line through which Internet, video, and television is delivered to the home. Most WAPs implement the IEEE 802.11 standard which is a contention based standard for handling communications among multiple competing devices for a shared wireless communication medium. The WAP controls access to the shared communication medium using a multiple access methodology identified as Collision Sense Multiple Access (CSMA). CSMA is a distributed random access methodology first introduced for home wired networks such as Ethernet for sharing a single communication medium, by having a contending communication link back off and retry access to the line if a collision is detected, i.e. if the line is in use. Collisions however are not easily detected in wireless home network communications, and therefore a competing links are subject to a further refinement identified as Collision Avoidance, in one form of which a link sends a request over the wireless medium which only elevates to actual data transmission if clearance to send is received from the target device. Thus the contention based protocol for wireless home networks is identified as Collision Sense Multiple Access/Collision Avoidance (CSMA/CA).

What is needed is a WAP with improved capability for forming a home network with multiple competing devices.

SUMMARY OF THE INVENTION

The present invention provides a method and apparatus for a wireless access point configured to support a wireless home network among multiple wireless devices contending with one another for access to a shared wireless communication medium. In an embodiment of the invention the wireless access point comprises a link monitor and a link manager. The link monitor monitors communication links with each of the wireless devices and for detects oversubscription of the wireless communication medium by the communication links. The link manager couples to the link monitor and is responsive to an oversubscription indication therefrom to arbitrate access to the shared wireless communication medium among the contending wireless devices.

The invention may be implemented in hardware, firmware or software.

Associated methods and means are also claimed.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

Figure 1:
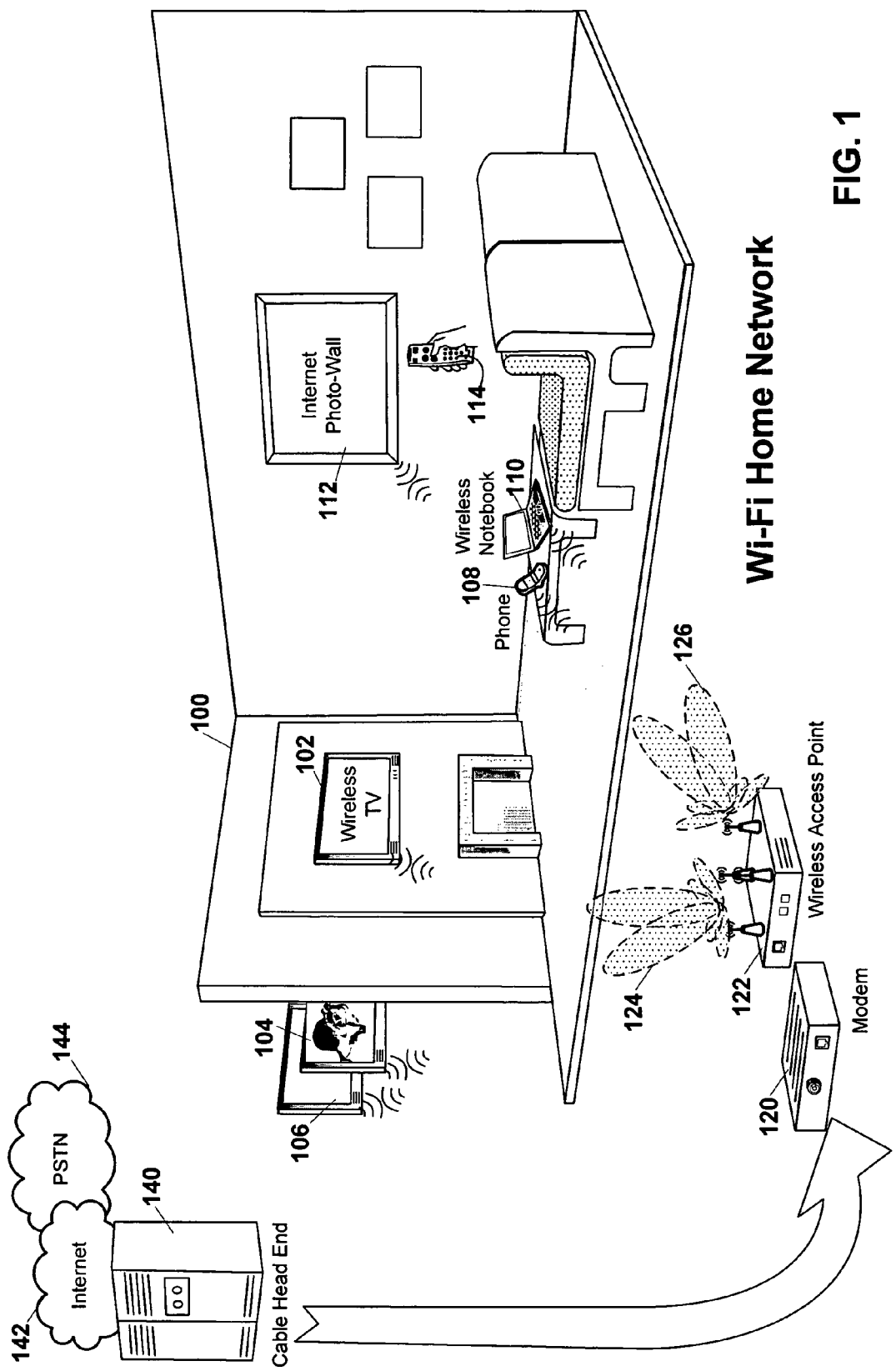
FIG. 1 is a system diagram of a representative wireless home network including the Wi-Fi Wireless Access Point (WAP) of the current invention.

FIG. 1 is a system diagram of a representative wireless home network including the Wi-Fi Wireless Access Point (WAP) of the current invention. A home or residence 100 is shown with a plurality of wireless devices including: televisions 102, 104, 106 controlled by remote 114; phone 108; notebook 110; and photo panel 112. The wireless devices are coupled to one another by a WAP 122 to form a network. In the embodiment shown the WAP has multiple antennas allowing beam forming 124-126 and resultant increased throughput to each device in the network using a signal processing methodology identified as: Multiple-Input Multiple-Output (MIMO). The wireless network formed by WAP 122 couples via modem 120 to cable head end 140 and also to the Internet 142 and the Public Switched Telephone Network 144. The number of wireless devices that can couple to the WAP may exceed the capacity of the WAP, thus resulting in oversubscription of links and the potential for system wide degradation of all links on the wireless home network. The embodiment of the WAP shown in the following FIG. 2 manages oversubscription to prevent such system wide degradation.

Figure 2:
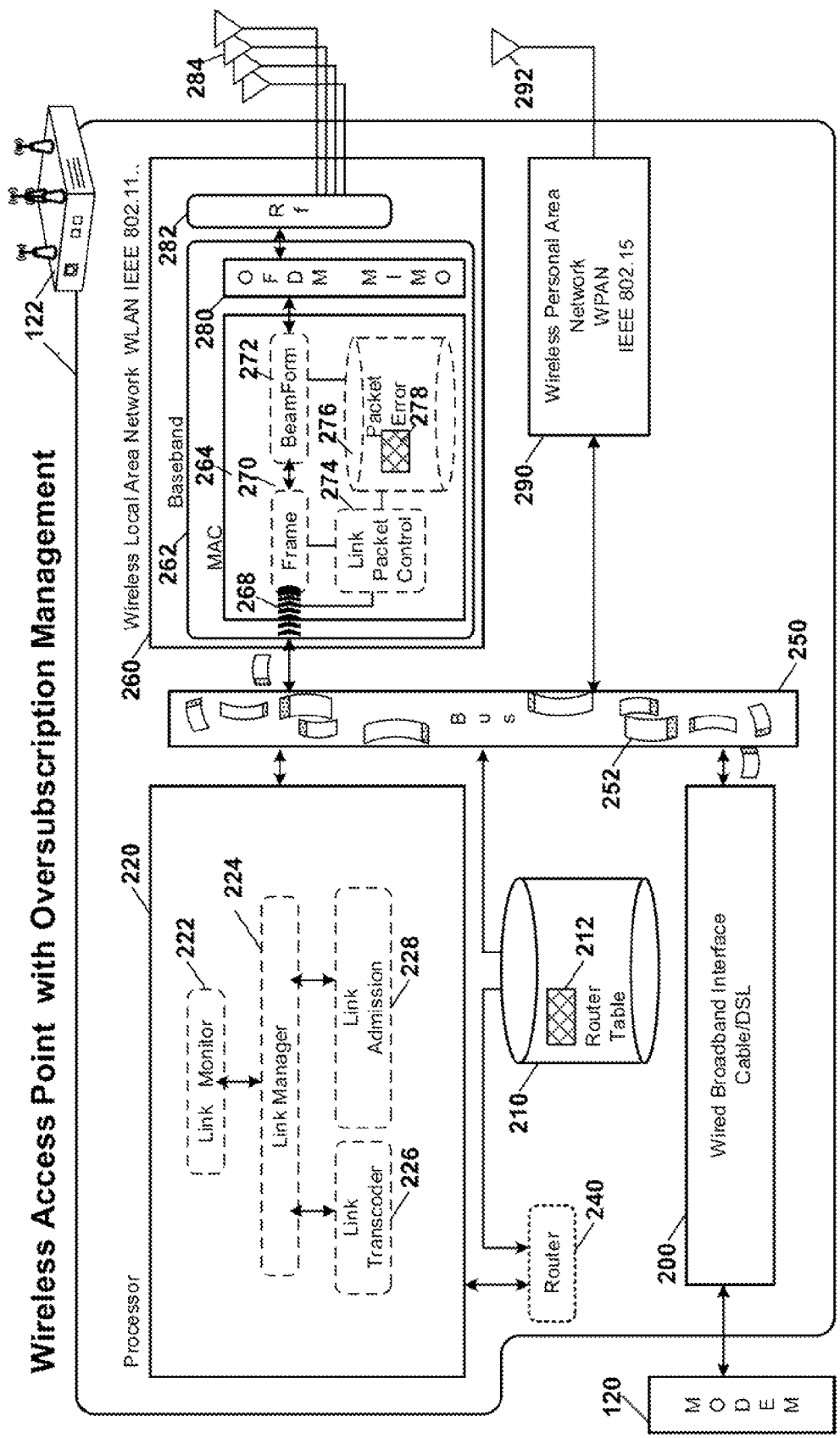
FIG. 2 is a detailed hardware block diagram of an embodiment of the Wi-Fi WAP of the current invention.

FIG. 2 is a detailed hardware block diagram of an embodiment of the Wi-Fi WAP 122 as shown in FIG. 1 coupled to cable or subscriber line modem 120. The WAP includes a wired broadband interface 200 to couple to a cable or digital subscriber line modem for example. The broadband interface 200 couples via packet 252 bus 250 to a processor 220, storage 210 and one or more wireless network stages: e.g. wireless local area network (WLAN) stage 260 implementing the IEEE 802.11 standard; and Wireless Personal Area Network (WPAN) stage 290 implementing IEEE 802.15 respectively.

The WPAN stage includes an antenna 292. The WLAN stage includes multiple antennas 284 and utilizes MIMO signal processing to drive a contending link onto the antenna array 284 to improve both signal reception and throughput. In alternate embodiments of the invention the WLAN stage utilizes a single antenna without the benefits associated with MIMO or beam forming.

WLAN stage 260 includes baseband 262 and radio frequency (RI) 282 components. The baseband component includes a media access control (MAC) sub-component 264 and an Orthogonal Frequency Division Multiplexed (OFDM) MIMO sub-component 280. The MAC sub-component includes: transmit and receive buffers 268, coupled to framing and beam forming modules 270, 272 respectively. Per link packet errors 278 and other communication statistics are stored in memory 276. The link packet control module 274 is responsive to commands from the link manager 224 to drop or skip packets associated with a contending communication link with attendant high relative cost as determined by the link manager, in an embodiment of the invention.

The processor 220 is shown with a link manager module 224, coupled to a link monitor module 222 as well as a link transcoder module 226 and a link admission module 228. Generally these components operate in conjunction with a targeted one of the WLAN or WPAN wireless stages to manage oversubscription, by detecting the onset of oversubscription in the link monitor 222 and by making a correction to one or more links responsive thereto in the link manager. The link manager also handles all packets associated with each communication link including dropping packets of a high cost communication link when the network is in an oversubscribed state and further when content delivery from the head end can not be stopped. These corrections reduce, minimize or eliminate oversubscription of communications links on the targeted wireless stage 260 or 290. The link transcoder module 226 allows the throughput requirements of a TV channel communication link to be reduced by altering the color pallet, or resolution, e.g. number of lines or number of pixels of the channel. In an embodiment of the invention transcoding is performed in the WAP. In an alternate embodiment of the invention it can be performed at the head end or other content delivery source assuming support at the head end for an oversubscription message from the link admission module. In an alternate embodiment of the invention audio or video transcoders are utilized to provide similar throughput reduction for their associated content types. Where upstream signaling of a content source is supported the link admission module 228 can be used to send an appropriate command or message, e.g. to the cable head end, to alter or stop delivery of content on a high cost communication link, thereby eliminating oversubscription and its negative effects on remaining links on the wireless network.

In an embodiment of the invention the WAP may also include a router 240 with associated routing table 212 in storage 210.

Figure 3B:
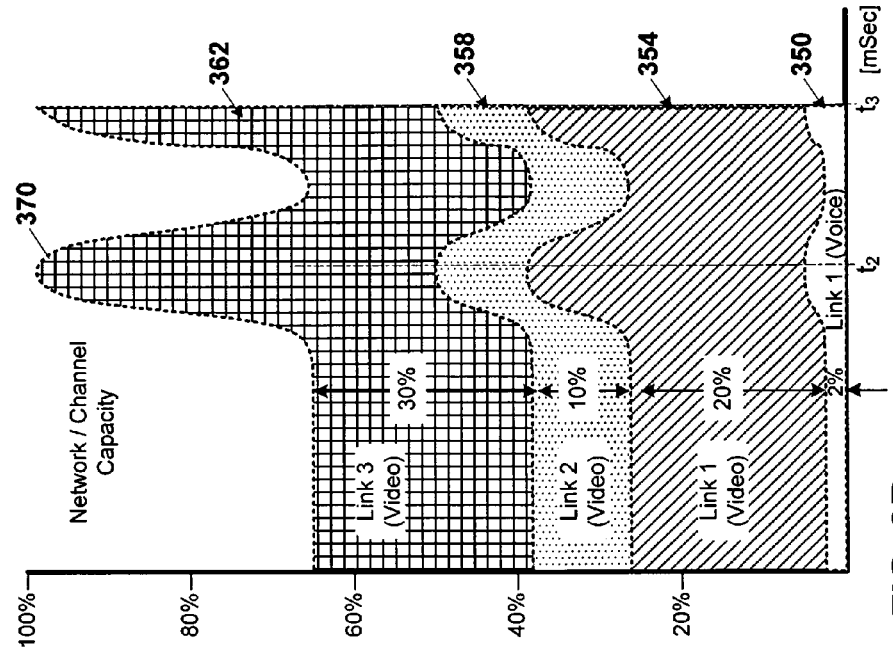
FIGS. 3A, 3B are graphs showing link throughput and link channel utilization respectively on a representative wireless home network.
Figure 3A:
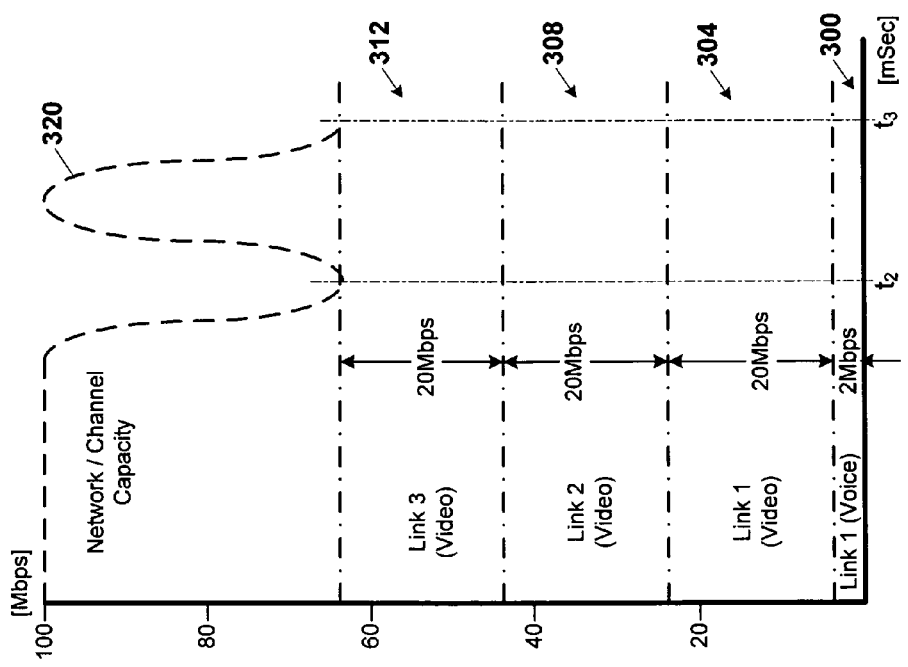

FIGS. 3A, 3B are graphs showing link throughput and link channel utilization respectively on a representative wireless home network.

FIG. 3A is a graph of channel capacity 320 and actual stacked link throughput expressed on the vertical axis as mega bits per second (Mbps) over time on the horizontal axis expressed in milliseconds (mSec). Communications links 1-3 are shown, each including a 20 Mbps Video feed 304, 308, 312 respectively and link 1 additionally including a voice component 300, e.g. a concurrent Internet phone call with a throughput of 2 Mbps. The link throughput are shown as constant over a time in which the network experiences two major degradations in capacity at times t2 and t3, either of which place the wireless network at or near an oversubscribed state, in which either the introduction of a new link, or a further degradation of the channel capacity would adversely effect communications on all links.

FIG. 3B is a graph of aggregate channel utilization 370 by each individual stacked link expressed on the vertical axis as percent (%) over the same time on the horizontal axis expressed in milliseconds (mSec) as shown in FIG. 3A. Communications links 1-3 are shown, each including the 20 Mbps Video feeds shown in FIG. 3A but each taking vastly different percentages of channel capacity 354, 358, 362 respectively to achieve that throughput. Link 1 additionally includes the voice component 350. Communication link 3 for example consumes 30% of network capacity while Link 1 takes only 20% and Link 2, the most efficient of all takes only ⅓ the time to transmit and receive as does link 3 or 10% of channel capacity. In this example, the wireless device associated with link 3 is more remote from WAP 122, and likely not in the line of sight thereof, rather occluded by numerous walls and other impediments within the house, which result in the slower throughput and resultant longer airtime requirements to achieve the same data throughput as the other communications links.

Figure 4:
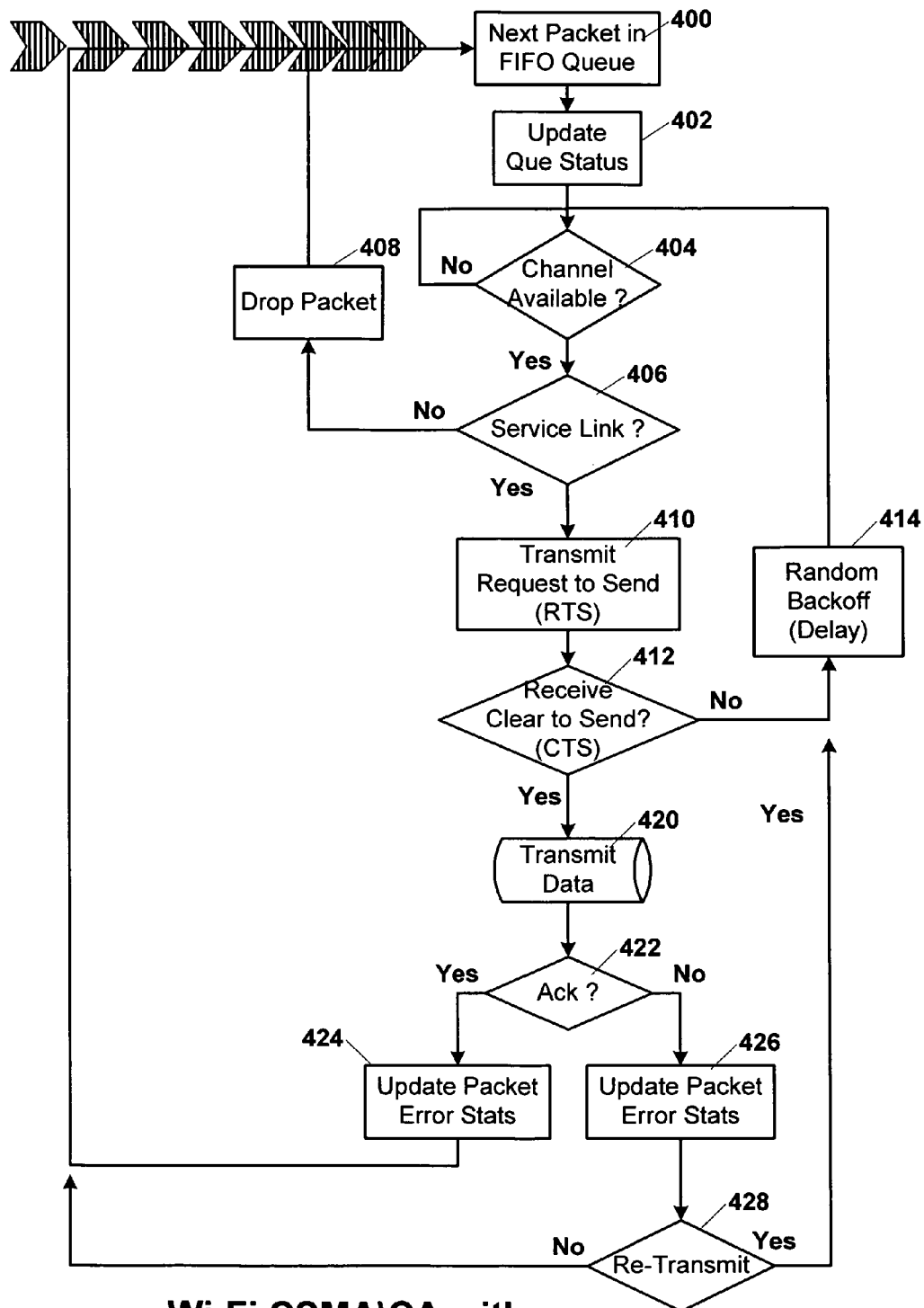
FIG. 4 is a process flow diagram of processes associated with Carrier Sense Multiple Access with Collision Avoidance (CSMA/CA) including oversubscription management in accordance with an embodiment of the current invention.

FIG. 4 is a process flow diagram of processes associated with Carrier Sense Multiple Access with Collision Avoidance (CSMA/CA) including oversubscription management in accordance with an embodiment of the current invention. In an embodiment of the invention these may be implemented in the baseband portion of the corresponding wireless stage.

In process 400 the next contending packet in the FIFO queue is processed and the queue status, e.g. length of queue, is updated in process 402. Next in decision process 404 a determination is made as to whether the channel is available or in use by another communication link. If the channel is available then control passes to the next decision process 406, in which a determination is made as to whether the communication link associated with the subject packet is subject to oversubscription arbitration. If the associated communication link has been determined to be too costly given an oversubscribed wireless network capacity then control is passed to process 408 in which the packet is dropped and control returned to process 400 for the processing of the next packet. Alternately, in process 410 if the subject communication link is being processed then control passes to process 410.

In the remaining steps collision avoidance processes are implemented in accordance with an embodiment of the invention, with the transmission of a request to send (RTS) 410 and a determination of receipt of a responsive clear to send (CTS) in default of which a random back-off 414 is implemented before return to decision process 404. Conversely, if the CTS response is received in decision process 412 then control passes to process 420 in which the data associated with the communication link is transmitted. If receipt is acknowledged in decision process 422 then the packet error statistics are updated 424 and control returned to process 400 for processing of the next packet in the queue. Alternately if the receipt of the communication link data is not acknowledged then control passes to process 426 in which packet error stats are also updated and control passed to decision process 428. In decision process 428 a determination is made as to whether to attempt a re-transmit of the subject packet or drop it and move on to the next packet.

In an alternate embodiment of the invention RTS and CTS are not used and the link that has channel access will check for channel availability and either transmit or back-off depending on the availability of the channel.

Figure 5:
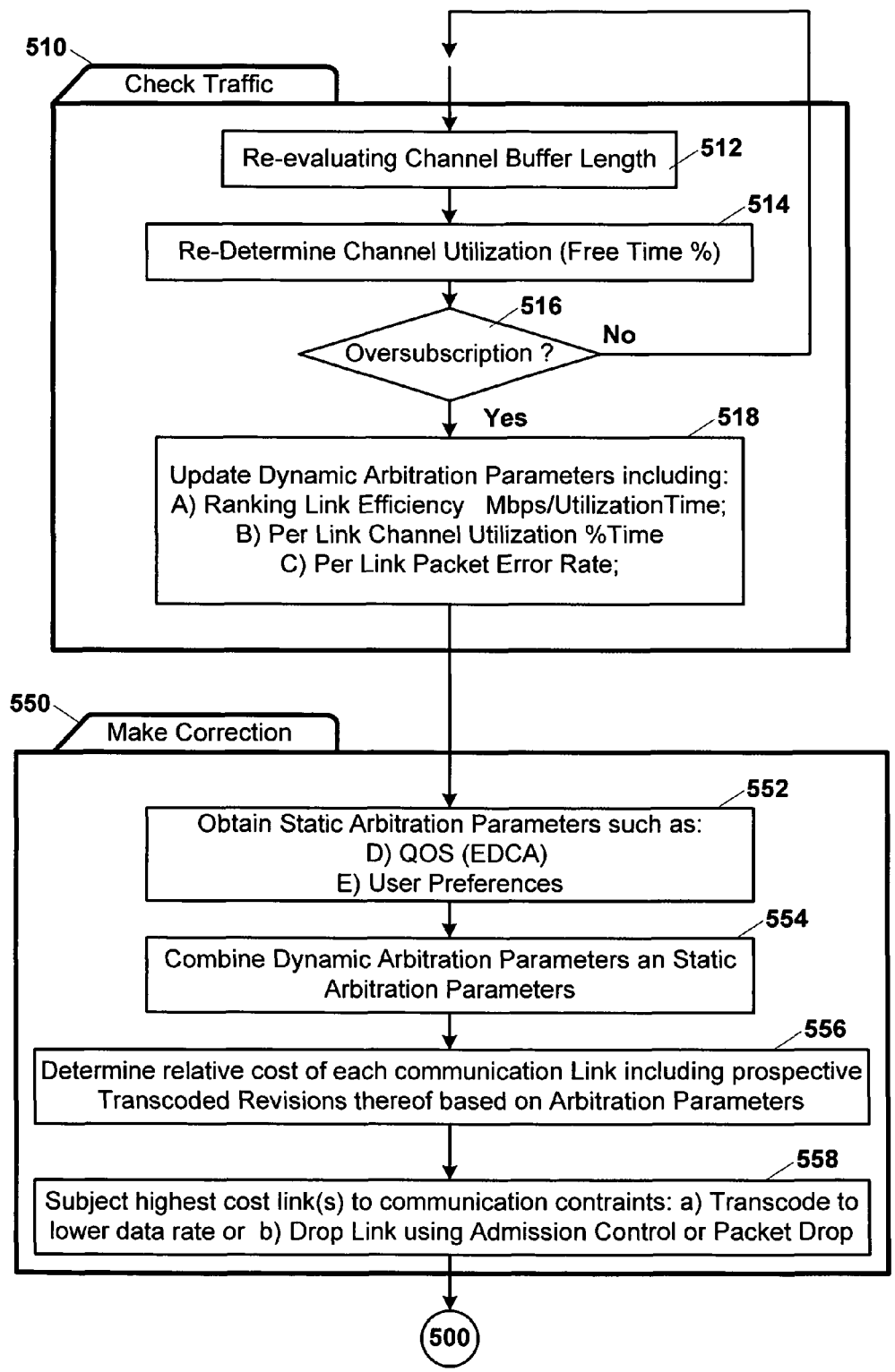
FIG. 5 is a process flow diagram of processes associated with oversubscription management in accordance with another embodiment of the current invention.

FIG. 5 is a process flow diagram of processes associated with oversubscription management in accordance with another embodiment of the current invention. In an embodiment of the invention these may be implemented in the processor of the WAP.

In processes 510 traffic on the wireless network is checked for oversubscription and subsequently if oversubscribed control is passed to processes 550 in which corrections are made to network traffic to reduce, minimize, or eliminate oversubscription. These processes would in an embodiment of the invention and in the context of FIG. 2 be conducted in the link monitor 222 and link manager 224 respectively.

The wireless network traffic checking processes in an embodiment of the invention include re-evaluating channel buffer length in process 512 to obtain a crude indicia as to oversubscription on the wireless network, e.g. if the buffer length exceeds a set threshold, then the wireless network is oversubscribed. Next in process 514 channel utilization percentage is re-determined to obtain another indicia as to oversubscription on the wireless network, e.g. if in any given interval/window of time communication link transmission account for greater than a threshold percentage of the interval then the wireless network is oversubscribed. Next, in decision process 516 either or both the criteria developed in the preceding processes are evaluated and a determination is made as to network over-subscription or the onset thereof. If the network is oversubscribed then control passes to process 518 in which one or more dynamic link arbitration parameters are re-determined using data obtained from the corresponding wireless stage. These include: A) ranking the efficiency of each communication link, e.g. the amount of time required to transmit comparable amounts of data; B) determining per link channel utilization, e.g. the relative percentages of channel time required by each link; and C) determining the per link packet error rate, e.g. the number of lost packets requiring retransmission.

If a correction to the communication links is required then control passes to the first of the correction processes 552. In process 552 one or more static link arbitration parameters are confirmed, e.g. D) Quality of Service (QOS) assigned to each communication link or Enhanced Distributed Channel Access (EDCA) assigned thereto; and E) User Preferences assigned to a given device or user or communication link. Next in process 554 the dynamic and static arbitration parameters are combined and in process 556 the relative cost of each communication link is determined. This determination includes in alternate embodiments of the invention costs calculated with the assumption of implementing one or more levels of transcoding. Next in process 558 the highest cost link(s) are subject to communication constraints to return the channel to an undersubscribed state. Communication constraints include: a) Transcoding a high cost communication link to a lower data rate; or b) dropping a high cost communication link at the head end of admission control is available or at a packet level if not.

Network Oversubscription Detection in an alternate embodiment of the invention involves: setting an oversubscription observation time interval (OTI) and a Total Network utilization threshold (NUT). Next channel utilization (CUT) for each communication link is defined using the time (units) used in an OTI, e.g. a communication link "A" uses 50 32 us time units in a 500 ms window for example. Next total channel utilization (TCU) is determined as the sum of Channel Utilization for all communication links.

To determine whether the network is oversubscribed in a given network observation time interval (OTT) compute the total channel utilization (TCU) corresponding to the sum of the channel utilization times of all active communication links "i". If TCU>NUT then the network is oversubscribed and a computation of the cost factors associated with each link is required, e.g. a Network Oversubscription Correction (NOC).

Generally a NOC determination involves one or more of the following arbitration parameters:

C—Configured Priority controlled by user, e.g. an integer from 0-7 with 0 being the highest priority and lowest cost (e.g. a voice stream is 0, a live football game 1 and a recorded movie 4) thereby retaining communication link preferences of the user or administrator.

U—WM utilization factor, e.g. an integer between 0 and 10 with 10 being 100% utilization of the wireless communication channel and the highest possible cost for a single communication link.

E—EDCA priority for access category as an integer between 0-7 with 0 being the highest access priority and lowest cost.

P—PER is the Packet error rate for each communication link calculated during $T_o$ observation window, normalize to 10, thereby assigning a highest cost to nodes with highest PER and re-transmission requirements.

A decision to drop a stream will be a complex utilization cost function of C, U, E and P where the cost $J_i$ of each communication link is a function of each arbitration parameter. For example:

$$J_i = \alpha_C C_i + \alpha_U U_i + \alpha_E \frac{1}{(1+E_i)} + \alpha_P P_i$$

The alpha terms are the weighting factors for the corresponding arbitration parameters. A lower Ji means a lower cost, means a more reliable and desired communication link with less impact on the performance of other streams.

The process is iterative where the cost $J_i$ for each communication link is computed and the communication link with the highest cost is removed or transcoded to a lower required data throughput rate. The total channel utilization is compared to the established network utilization threshold. If total channel utilization is below the threshold then the network is not oversubscribed and no more link pruning is required until the next evaluation interval. If not further cost calculations are made and the next most expensive communication link is dropped or transcoded to a lower data The components and processes disclosed herein may be implemented as software, hardware, firmware, or a combination thereof, without departing from the scope of the Claimed invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A wireless access point (WAP) configured to support a wireless home network among a plurality of wireless devices contending with one another for a communication link to the WAP over a shared wireless communication medium; and the WAP comprising:

a link monitor configured to monitor dynamic arbitration parameters including at least one of a relative efficiency and a relative utilization of each communication link between the WAP and a corresponding one of the plurality of wireless devices and to detect an onset of oversubscription of the shared wireless communication medium by the plurality of wireless devices; and a link manager coupled to the link monitor and configured responsive to an oversubscription indication therefrom to determine at least a relative cost of each wireless device's communication link from the WAP based on both the dynamic arbitration parameters together with static arbitration parameters and to limit access of a selected one of the plurality of wireless devices associated with the most costly communication link to the WAP; wherein the access limitations include at least one of: transcoding the corresponding communication link to a lower data throughput, dropping packets of the subject communication link, and signaling a content delivery source to stop delivery of the content associated with the communication link; thereby avoiding oversubscription of the shared wireless communication medium.

2. A method for operating a wireless access point (WAP) configured to support a wireless home network among a plurality of wireless devices contending with one another for a communication link to the WAP over a shared wireless communication medium; and the method comprising:

monitoring dynamic arbitration parameters including at least one of a relative efficiency and a relative utilization of each communication link between the WAP and a corresponding one of the plurality of wireless devices;

detecting an onset of oversubscription of the shared wireless communication medium by the plurality of wireless devices;

determining at least a relative cost of each wireless device's communication link to the WAP based on both the dynamic arbitration parameters together with static arbitration parameters; and limiting access of a selected one of the wireless devices associated with the most costly communication link to the WAP as determined in the determining act, by performing at least one of the acts of:

transcoding the communication link between the selected one of the plurality of wireless devices and the WAP to a lower data throughput;

dropping packets of the subject communication link; and signaling a content delivery source to stop delivery of the content associated with the communication link;

thereby avoiding oversubscription of the shared wireless communication medium.

3. A The method of claim 2, wherein the transcoding act further comprises the act of:

altering a color pallet of video data associated with the most costly communication link to reduce a data rate requirement associated therewith.

4. The method of claim 2, wherein the transcoding act further comprises the act of:

altering an image resolution of video data associated with the most costly communication link to reduce a data rate requirement associated therewith.

* * * * *